Nov. 15, 1960 — B. M. MERCER — 2,959,853
HAIR TRIMMERS
Filed Dec. 18, 1957 — 2 Sheets-Sheet 1
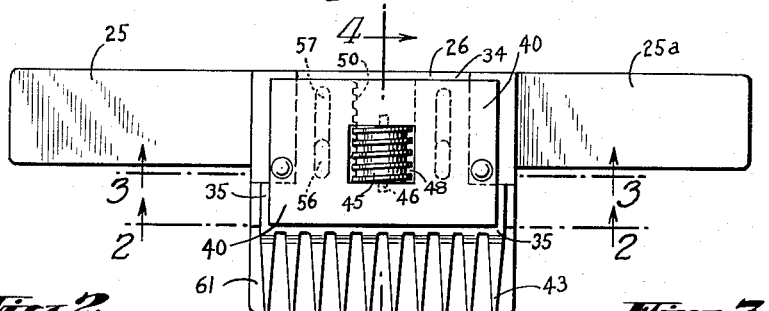
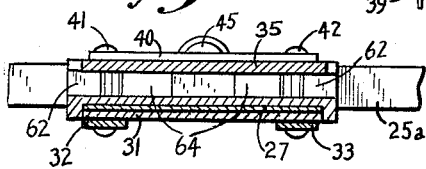
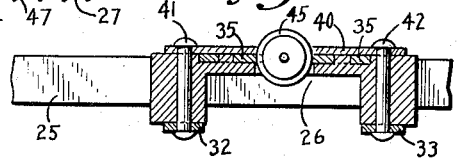
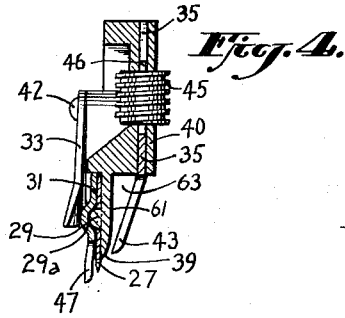
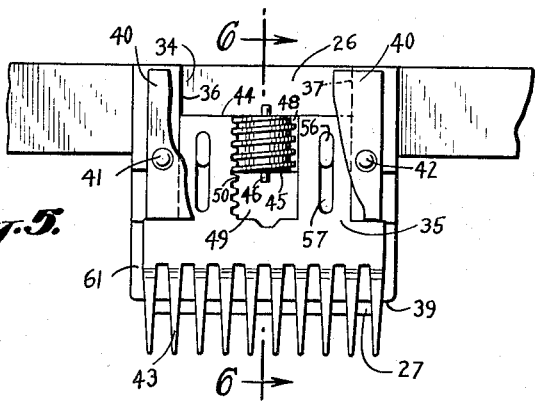
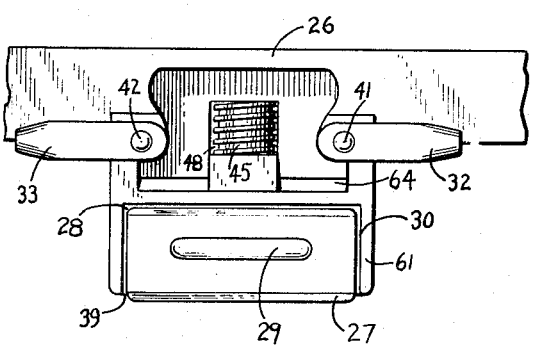
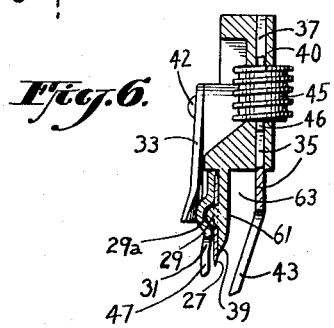
INVENTOR.
Bert M. Mercer.
BY Howard P. King
ATTORNEY.

Nov. 15, 1960 B. M. MERCER 2,959,853
HAIR TRIMMERS
Filed Dec. 18, 1957 2 Sheets-Sheet 2
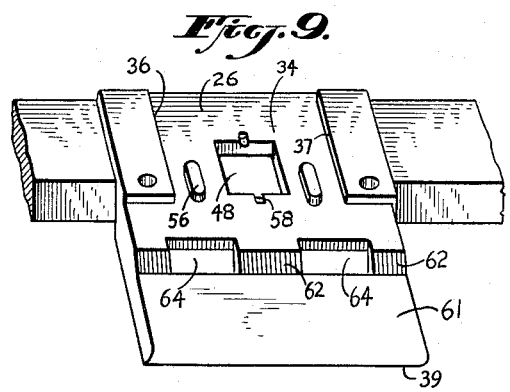
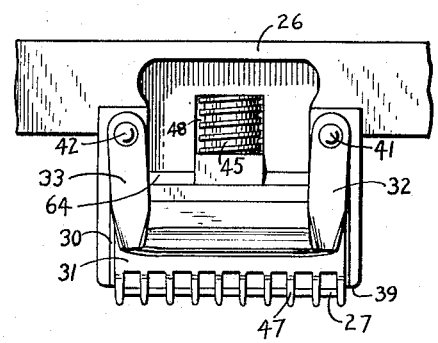
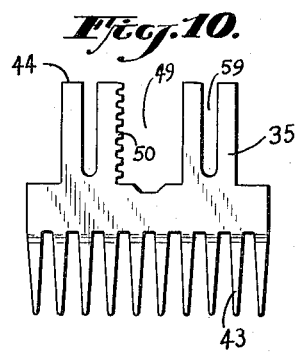
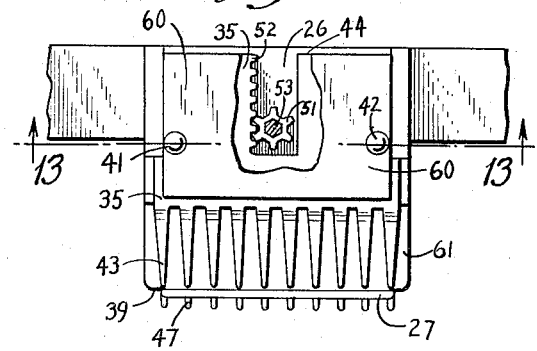
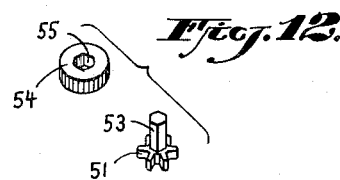
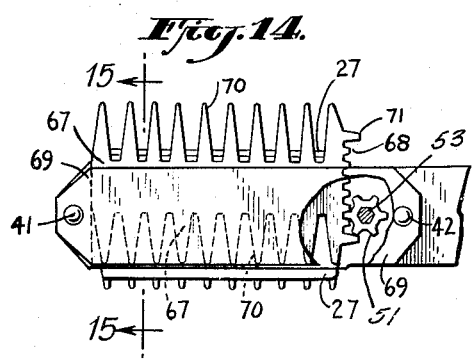
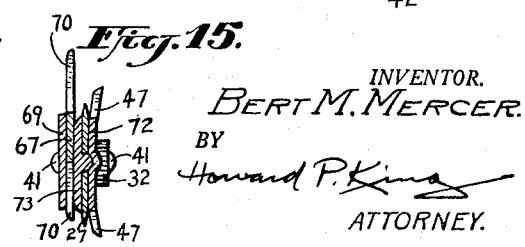
INVENTOR.
BERT M. MERCER.
BY
Howard P. King
ATTORNEY.

United States Patent Office 2,959,853
Patented Nov. 15, 1960

2,959,853

HAIR TRIMMERS

Bert M. Mercer, 140 W. 71st St., New York, N.Y.

Filed Dec. 18, 1957, Ser. No. 703,549

11 Claims. (Cl. 30—31)

This invention relates to hair trimmers and more particularly to one which employs a mounted razor for cutting and shaving hair.

Heretofore trimmers of this nature include awkward means for inserting the cutting blade, which necessitates handling the sharp cutting edge of the blade. Also, other devices require the blade itself to be moved backward and forward by mechanical means to adjust the measurement of the cutting edge, which arrangement results in forfeiture of the rigidity of the blade and consequently of its maximum cutting efficiency. Also in those cutting devices where a cutting guard rather than the blade moves backward and forward by mechanical means to control the cutting measurement, and where the cutting guard lies directly upon a stationary blade, a loose contact is required between the blade and cutting guard to permit such movement, which causes the blade to forfeit its rigidity and permits the hairs to work their way in between the blade and those parts to which it is connected, consequently requiring frequent manual cleaning out, thereby subjecting a person's fingers to frequent contact with the cutting edge of the blade. In other trimmers where the cutting guard is comprised of wires which permanently surround the edge of the blade, the accumulation of hair between the razor blade and the guard, and between the individual wires of the guard, has to be removed with a long, spiral-type brush which necessarily brushes against the edge of the blade, thereby inadvertently causing wear and damage to the sharp edge of the blade. It is a fact that cutting a long flexible hair is more difficult than cutting a short, stubby or bristly hair, such as in face-shaving. Therefore wear or damage to a razor blade edge is more critical when it is used for trimming than for shaving. Furthermore, trimmers of this nature have failed to provide for an automatic mechanically controlled setting of the blade for shaving areas such as the neck, and attempts to shave with a hair trimmer which lacks such safeguards usually results in skin-cutting if the shaving setting is guessed at incorrectly. In explanation, a safety razor has a safety guard which precedes the razor and holds the skin down so that the skin area to be shaved is more uniform and taut. This is similar to stretching or holding the skin down which is required when shaving with a straight razor. Since the skin on the neck area may be loose, fleshy, and wrinkly and since a hair trimmer of this type is designed to be used by one's self, the necessity of a safety razor type construction for shaving that area is more critical than that required for shaving the face. Those trimmers which have one handle and are manipulated by a self-user require a cutting measurement adjustment each time the user switches from one hand to the other, which is not only time consuming but it causes duplicating efforts to arrive at the desired adjustments.

It is therefore an object of the invention to provide a hair trimming and shaving device wherein the cutting blade is mounted quickly, easily, and safely with minimum danger to inadvertently cutting one's finger in the process.

It is another object of this invention to utilize a non-moving blade mounted and secured so that it will be rigid and without vibration during its use, and which will prevent hair from lodging between the blade and its housing.

It is still another object of this invention to provide a cutting blade which is mounted independently of the adjusting cutting guard, so that the cutting guard does not move against the body of the blade.

It is a further object of this invention to provide a hair trimming device with an adjustable cutting guard which may be adjusted by means of motivating devices which are efficient yet inexpensive to manufacture and assemble.

It is a still further object of this invention to provide a hair trimming device with a cutting guard which can mechanically and automatically be adjusted to a shaving position, which in conjunction with a blade and a blade cover is similar in action and efficiency to a safety razor.

It is a still further object of this invention to provide an improved blade cover retainer.

Yet another object of this invention is to provide a hair trimming device which permits the ready removal of accumulated cut hair without endangering the edge of the blade or the user's fingers.

Still further objects of the invention will appear to persons skilled in the art to which it apertains, as the description proceeds, both by direct recitation thereof and by implication from the context.

Referring to the accompanying drawings in which like numerals of reference indicate similar parts throughout the several views:

Figure 1 is a top plan of the preferred embodiment of the invention with the adjustable cutting guard in a fully retracted position;

Figures 2 and 3 are longitudinal fragmentary sectional views taken on lines 2—2 and 3—3 of Fig. 1 respectively;

Figure 4 is a transverse sectional view taken on line 4—4 of Fig. 1;

Figure 5 is a top plan partly broken away, and with part of the cutting guard bridge plate removed, showing the cutting guard in a fully extended cutting position;

Figure 6 is a transverse sectional view taken on line 6—6 of Fig. 5;

Figure 7 is a fragmentary view of the bottom of the hair trimmer showing the cutting blade in its housing before it is covered by its blade cover.

Figure 8 is a fragmentary bottom plan showing the cutting blade in a locked-in position ready for use;

Figure 9 is a fragmentary perspective view of the top of the trimmer before any of the component parts are assembled thereto;

Figure 10 is a top view of a modified form of the cutting guard apart from the rest of the trimmer;

Figure 11 is a fragmentary top plan of a modified form of the invention, showing the cutting guard bridge plate partly removed;

Figure 12 is a perspective view of the axially vertical gear and its shaft, and of the operating knob therefor;

Figure 13 is a longitudinal fragmentary sectional view taken on lines 13—13 of Figure 11.

Figure 14 is a top plan of another modified form of the invention, showing the cutting guard bridge plate partly removed;

Figure 15 is a transverse sectional view taken on lines 15—15 of Fig. 14.

In its general organization, the present invention is directed to a hair trimmer comprising a body in which a safety razor type blade is non-movably and rigidly housed on one side of the body of the trimmer, and a cutting guard is mounted on the other side and is slidingly motivated back and forth adjacent to the cutting edge of the razor blade in order to regulate the closeness of the cutting. The motivating means employed to actuate the cutting guard are shown preferably located at the center of such guard, but said means could be located at any other position, such as at either side edge of the guard. The cutting guard consists of a comb-like member which permits uniform shaving in its fully retracted position, and the cutting of the hair to various cutting lengths according to the position of the cutting guard. Means are also provided for accumulation of the cut hairs and the ready removal thereof without disturbing the position of the cutting guard or the razor blade.

In the specific embodiment of the invention as shown in Figures 1 to 9, the hair trimmer has a body consisting of two handles 25 and 25a located at opposite sides of the medial portion 26. The cutting blade 27 sets into a blade recess or housing 28 on the medial bottom portion of the trimmer body, as best seen in Fig. 7. A narrow lug 29 at approximately the center of said blade housing 28 extends longitudinally from a short distance from one side edge 30 to a similar distance from the other side edge of the blade housing. The blade 27 which has a longitudinal slit, is placed over lug 29 which prevents lateral movement of the blade. A blade cover 31, which has a longitudinal hollow 29a, fits into the blade housing 28 and over the blade 27 and its restraining lug 29. The blade cover 31 has short teeth 47 at its front edge which protrude slightly beyond the edge of the cutting edge of the blade 27. Two swivel arms 32 and 33, best shown in Figs. 7 and 8, each to the rear of the blade housing 28, are swiveled to a position over the blade cover 31, at opposite side areas thereof, to keep said blade cover 31, and the blade 27 in a tightly assembled rigid position, and to prevent cut hair from working its way in either below or above the blade and the member adjoining it. The location of the swivel arms 32 and 33, with relation to the blade 27 keeps the user's fingers away from the blade's edges and eliminates the possibility of inadvertent cuts.

The area of the top section of the medial portion 26 of the trimmer contains a cutting guard recess or channel 34 which has parallel walls 36 and 37 at opposite sides, and which channel 34 slidingly receives the cutting guard 35. Restraining means applied to the cutting guard 35 so that it remains snugly within its channel recess 34 is herein shown arbitrarily in the form of a bridge plate 40. Said bridge plate 40 extends across the channel 34 beyond both side walls 36 and 37 thereof. Two rivets 41 and 42 penetrate holes at side portions of the bridge plate 40, through the medial body portion 26 of the trimmer, and through the two swivel arms 32 and 33 on the bottom side of the trimmer, and permanently affix these members to the body of the trimmer. The cutting guard 35 has comb teeth 43 in the front area which slope downwards, as best shown in Figs. 4 and 6. The medial front edge 39 of the body of the trimmer is the front edge for the edge of the razor blade 27 on its bottom portion, and for the overlying guard comb teeth 43 on its top portion.

When the cutting guard 35 lies wholly within its channel 34, or in its fully retracted position, the relation of the guard comb teeth 43, the edge of the blade 27, and the blade cover teeth 47, are in a position to form a shaving angle and function similar to that of a safety razor. The blade cover teeth 47 supply the safety factor in the shaving process and one can shave the back of one's neck with maximum safety. In the cutting or shaving process the top of the trimmer, specifically the cutting guard teeth 43, always face and lie against the user's hair. Twin lugs 56, which lie within the channel recess 34, fit within a pair of transverse apertures 57 in the rear portion of the cutting guard 35. These twin channel lugs 56 form a stop means when their front edges meet the front sides of the apertures 57 in the cutting guard 35, which stop means assures the correct shaving position for the cutting guard 35, then in its fully retracted position. The channel lugs 56 and the cutting guard apertures 57 can easily be substituted with similar stop means by using some other cutting guard edge which faces the rear of the trimmer, and an opposing or abutting body portion of the trimmer.

When cutting rather than shaving hair is required the cutting guard 35 is slidably actuated to extend outward, towards and beyond the edge of the blade 27, and the extent to which the guard is so extended governs the length of hair which the blade can reach for cutting. The cutting guard teeth 43 are positioned to be aligned with the blade cover teeth 47 so that in use both sets of teeth act to produce only a simple comb effect. The mechanism used to slidably move the cutting guard 35 is the combination of a rotary gear seated within the body of the trimmer and a gear rack formed in the cutting guard 35. This mechanism is here shown to be a helical or worm gear 45 which has an axle 46 at each axial end. Within the approximate medial portion of the cutting guard channel is an aperture 48 which extends through the trimmer body, and at each end of said aperture is a small axle depression 58. The axles 46 of the helical gear 45 are placed within the axle depressions 58 so that the gear rotates about its axis.

Within the medial portion of the bridge plate 40 is an aperture through which the gear 45 protrudes, and since the bridge plate aperture is in registration with the trimmer body aperture 48, the same reference numeral 48 is given to it, signifying the combination of the juxtaposed registering apertures functioning as a unit. The bridge plate aperture 48 fits over the helical gear 45 and the body of the bridge plate 40, adjoining its aperture 48, rests upon its twin axles 46 thus holding the helical gear 45 permanently in place.

Medially of and extending to the rear edge 44 of the cutting guard 35 is a wide slot 49. At one side of the slot 49 is a gear rack 50 which meshes and interlocks with the helical gear 45. While only one gear rack 50 is shown here, two gear racks could conveniently and beneficially be provided, one at either side of slot 49. When the gear 45 is actuated by the fingers of the user, it thereby slides the cutting guard 35 either backward or forward depending upon the direction of the rotation of the gear wheel 45. The twin channel lugs 56, within the channel recess 34, form a stop means when the rear of the twin apertures 57 in the cutting guard 35 come into contact with the rear ends of said lugs 56. The cutting guard 35 is thereby prevented from being extended further outward and from becoming removed from its channel recess 34.

Should it be desired to have a slidably removable cutting guard 35 twin slots 59, as in Fig. 10, in the cutting guard 35 instead of twin apertures 57, as in Figs. 1 and 6, overcome the outward stop means provided by the twin lugs channel 56, and said slots 59 of the cutting guard 35 pass beyond the channel lugs 56, and outward, when so activated by the helical gear 45, until the entire cutting guard passes the helical gear 45 at which point the guard 35 can be manually pulled out and off the trimmer body entirely. An advantage for being able to remove the guard would be the more easy repair of the cutting guard teeth 43 if dropping the trimmer had caused damage thereto. The guard 35 may be reinserted by sliding the guard into channel 34 until the gear wheel 45 again meshes with the first tooth of the rack 50 after which the gear wheel alone will continue to motivate the cutting guard 35.

The helical gear 45 has screw like ridges which maintain a vertical position as they interlock with the rack 50 whose gear teeth lie in a horizontal position, thereby resulting in a right angle self-locking gear mechanism whereby the rack 50 cannot move forward or backward unless the helical gear 45 is manually rotated.

A modified form of a hair trimmer with a driving mechanism to slidingly motivate the cutting guard within its channel 34 is shown in Figs. 11 to 13, wherein a pinion or rotary gear 51 is used. This gear has meshing teeth which are in the same horizontal plane as the single gear rack 52 which is located on one of the sides of the slot 49 in the cutting guard 35, and which gear 51 lies underneath, and is held in place by the bridge plate 60. Before the bridge plate 60 is affixed to the hair trimmer the gear 51 is placed in a recessed housing medially of the cutting guard channel 34 area and a shaft 53 of the pinion 51 is placed through an aperture of similar dimensions in the bridge plate 60. The bridge plate 60 rests upon the pinion gear 51 thereby permanently securing it in place. The knob head 54 has a hole 55 of the same shape and size of the shaft 53 of the pinion 51, which fits snugly upon the shaft 53. The turning of the knob head 54 will then operate the pinion causing the cutting guard 35 to be slidingly motivated as described with reference to the preceding form. Since this modification has elements similar to those shown in the previous figures, the same reference numerals have been applied to designate such similar elements.

In the use of the aforementioned hair trimmers the long hairs tend to be pushed backward under the cutting guard. To prevent these hairs from accumulating and bunching up about the edge of the blade 27, which requires annoying and frequent hair removal, a space is provided between the cutting guard 35 and the body of the trimmer. Figs. 4 and 6 shows such space which is formed by a shelf 61 in the front portion of the trimmer body. The bottom side of the shelf 61 serves as the housing 28 for the blade, and the top side of the shelf 61 at the rear end thereof adjoins a substantially perpendicular wall 62. The top portion of such wall is referred to here as the top of the trimmer, where the cutting guard channel 34 is located. The cutting guard comblike teeth 43 are slanted downward so that their extremities lie close above the edge area of the blade 27. Between the shelf 61 and the overlying cutting guard 35 a pocket 63 is formed, with the perpendicular wall 62 constituting the rear portion of the pocket 63, which provides roomy space wherein the hairs can accumulate. This pocket 63 has open sides, per Fig. 4, through which the user can blow and thereby remove the hairs within, or through which the user can insert a spiral type comb to push the hairs out. Since long hairs can bunch up quickly further means of speeding their removal is provided by provision of apertures or windows 64, as shown best in Fig. 9 in the perpendicular wall 62, through which the hairs will flow or be pushed during the hair removal methods described above. Such windows 64 would be especially useful when water, especially running water from a sink tap, is available for the windows 64 serve to permit the water pressure to wash away the accumulated hairs. When the cutting guard 35 is in just a slightly extended position sufficient space is provided to permit the hairs to pass outward under the cutting guard. Thus three areas are provided to permit escape or removal of hair, namely: through the open sides of the pockets 63, through the windows 64, and at times, under the cutting guard 35. Figs. 4 and 6 show also that the pocket 63 is permanent in area and position and being distant from the razors edge, irrespective of the adjusted position of the cutting guard; permits hair removal with safety to the user and to the edge of the razor blade.

Another modified form of a hair trimmer with means to motivate the cutting guard is shown in Figs. 14 and 15. Since this modification has elements similar to those shown in Figs. 11 to 13, though somewhat relocated, repetition or further elaboration seems unnecessary, and the same reference numerals have been applied to designate similar elements.

In this modification the body 73 of the trimmer consists of the cutting portion at one end and a handle at the other. The pinion 51 is located at the side of and adjacent to the cutting guard 67, and its gear teeth lie on the same plane as the rack 68, at the side of the cutting guard 67, with which they mesh. The pinion 51 is operated by the same type of assembly, and it motivates the cutting guard 67 in the same manner, as described for Figs. 11 to 13. However in the modification of Figs. 14 and 15 both cutting edges of the razor blade 27 are exposed for cutting, and the blade cover 72 has protruding teeth on both edges similar to those of numeral 47. The cutting guard 67, which is located in a recessed channel is maintained in a sliding position by its bridge plate 69. Also both the rear or front comb teeth 70 of the cutting guard 67 can be automatically adjusted to a razor type shaving position, whereby the cutting guard 67 would be non-removable from its channel recess. An arbitrary means of effecting the stop means for the automatic shaving position is shown here by having an elongated tooth 71 of the rack 68 abut against either the pinion 51, or a stud on the trimmer body, not shown in the illustrations.

As a result of my invention, it will be seen that there is provided a hair trimmer which has a stationary razor blade, a cutting guard, and an improved means of mechanically adjusting said guard with relation to the razor blade which includes an automatic setting for safety razor type shaving, plus improved means of removal of accumulated and bunched up hairs.

While I have shown and described several embodiments which my invention may assume in practice, it will be understood that these are merely for the purpose of illustration and description and that various other forms may be devised within the scope of my invention as defined in the appended claims.

I claim:

1. A hair trimmer having a body portion, a razor blade having a cutting edge, means on the bottom side of said body portion retaining said blade stationary thereon, said body portion having a channel recess on the top side thereof, a cutting guard located within said channel recess, said body portion having an aperture opening into said channel recess and having axle depressions at two opposite edges of said aperture midway of the length of said recess, a helical gear having axle ends mounted in said depressions whereby said gear is located midway of the length of said recess, a bridge plate having an aperture which fits over said helical gear and with the bottom portion of said bridge plate resting both upon said axle ends and upon said cutting guard, means securing said bridge plate to said body portion, and a gear rack on said cutting guard in mesh with said helical gear whereby rotation of said helical gear applies operative force substantially medially of the length of the cutting guard and extends or retracts said cutting guard in a transversely slidable operative position within said channel recess in relation to the cutting edge of said stationary blade.

2. A hair trimmer in accordance with claim 1, wherein said cutting guard has comb-type teeth at a forward edge thereof the front tips whereof when said guard is in fully extended position lie beyond the edge of said blade and lie above and near the edge of said blade when the guard is in retracted position so that the edge of the blade protrudes beyond the tips of said comb-type teeth of the cutting guard leaving said edge of the blade fully exposed and adaptable for shaving, and stop means on the top portion of said trimmer body at both ends of and for locating said cutting guard at an exact retracted position where the tips of said comb teeth are automatically stopped at a correct shaving position with relation to the edge of the blade.

3. A hair trimmer in accordance with claim 2, wherein a removable blade cover is provided and held next to the blade at the opposite face thereof from said cutting guard.

4. A hair trimmer in accordance with claim 3, wherein said blade cover has teeth at its forward edge, said blade cover teeth overlying and projecting slightly beyond the edge of the blade and establishing a correct shaving angle of a plane tangential to the several teeth of the blade cover and simultaneously tangential to the tips of the several teeth of the cutting guard when said cutting guard is fully retracted.

5. A hair trimmer having a body portion with a longitudinal fixed front edge, a razor blade having a cutting edge parallel to and projecting beyond said longitudinal fixed front edge of the body in fixed relation to said edge and body, means on the bottom side of said body portion retaining said blade stationary thereon and in said fixed relation to said longitudinal fixed front edge, the top side of said body portion having a recess, a cutting guard within said top portion recess, means maintaining the cutting guard in a transversely slidable operative position within said top portion recess, means to manually slidably motivate said cutting guard, said cutting guard having comb-type teeth at a forward edge thereof, the front tips of said teeth when in their fully extended position projecting beyond the edge of said blade and in the fully retracted position having a position above and near the edge of said blade so that the edge of said blade protrudes beyond the tips of said teeth as well as beyond said longitudinal fixed front edge of the body leaving said blade edge fully exposed and adaptable for shaving, and stop means on the top portion of said trimmer body to stop said cutting guard at an exact retracted position where the tips of said teeth are automatically at a correct shaving position with relation to the blade and exposing said longitudinal fixed front edge of the body therebeyond and thereby providing the correct shaving angle.

6. A hair trimmer in accordance with claim 5, wherein said means to maintain the cutting guard in a transverse slidable operative position within said body portion top recess comprises a bridge plate overlying in part said cutting guard and said recess, with means to secure said bridge plate to said body portion.

7. A hair trimmer having a body portion with a bottom recess and a top recess, a razor blade in said bottom recess, said blade having a cutting edge transversely thereof, a blade cover retaining said blade stationary in said bottom recess, said top recess forming a channel with parallel walls, a cutting guard located within said top recess and within said channel, a bridge plate overlying in part said cutting guard and said top recess, and means securing said bridge plate to said body portion and thereby maintain said cutting guard in a transverse slidable operative position in said channel, and manually operated means to slidingly motivate said cutting guard, said blade cover plate having teeth extending from the forward edge thereof slightly beyond the edge of said blade, said cutting guard having comb-type teeth at the forward edge thereof which in a fully extended position of said cutting guard project beyond the edge of said blade and in fully retracted position are at shaving position and lie slightly above and slightly back of the edge of said blade, and stop means on the top of said body for abutment thereagainst of said cutting guard when in its fully retracted position so that said guard is automatically stopped at said shaving position with relation to the edge of the blade and when so positioned a shaving angle and construction is formed by the tips of said cutting guard in conjunction with the cutting edge of the blade and the forward edge of said blade cover.

8. A hair trimmer in accordance with claim 7, wherein said manually operated motivating means is located intermediate of the ends of said cutting guard.

9. A hair trimmer in accordance with claim 7, wherein said blade retaining cover is held stationary thereon by means of swivel arms pivoted and retained on the trimmer body portion and having ends engageable over and holding said retaining cover and blade in fixed position.

10. A hair trimmer in accordance with claim 7, wherein the lower front portion of said trimmer body forms a shelf, the bottom side of which forms the said recess for said blade, and at the rear of said shelf on the top side thereof is a perpendicular wall which rises to the top side of said trimmer body, said shelf thereby in conjunction with said perpendicular wall and cutting guard forming a pocket triangular in cross section and open at its ends, said pocket accommodating a quantity of cut hair and the open ends enabling such hair to be removed.

11. A hair trimmer in accordance with claim 10, wherein said perpendicular wall has openings therein for discharge of hair from said pocket.

References Cited in the file of this patent

UNITED STATES PATENTS

| | | |
|---|---|---|
| Re 23,505 | Davis | May 27, 1952 |
| 1,471,970 | McElroy | Oct. 23, 1923 |
| 2,134,839 | Perkins | Nov. 1, 1938 |
| 2,636,261 | Shaeffer | Apr. 28, 1953 |
| 2,746,144 | Spanel | May 22, 1956 |

FOREIGN PATENTS

| | | |
|---|---|---|
| 467,519 | Italy | Dec. 10, 1951 |